United States Patent Office 3,467,752
Patented Sept. 16, 1969

3,467,752
PRESERVATION OF ORGANIC MATERIALS FROM MICROBIAL ATTACK WITH HALOGENATED URACILS
Robert Duschinsky, Montclair, and Max Hoffer, Nutley, N.J., assignors to Hoffmann-La Roche Inc., Nutley, N.J., a corporation of New Jersey
No Drawing. Continuation-in-part of application Ser. No. 277,441, May 2, 1963. This application June 16, 1966, Ser. No. 557,891
Int. Cl. A61l *13/00;* D21h *5/22*
U.S. Cl. 424—251  4 Claims

ABSTRACT OF THE DISCLOSURE

The preservation of organic materials from microbial attack with halogenated uracils.

---

This application is a continuation-in-part of Ser. No. 277,441, filed May 2, 1963, and now abandoned.

This invention relates to a method for inhibiting the growth of microorganisms and to anti-microbial compositions effective for this purpose. More particularly, the invention relates to a method of killing or inhibiting the growth of certain microorganisms with novel compositions containing as active ingredient a compoud of the formula

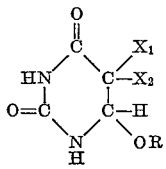

I wherein R represents lower alkyl; $X_1$ is fluoro or bromo and $X_2$ is bromo or chloro, preferably bromo.

The novel compounds of this invention can be prepared by reacting 5-bromouracil or 5-fluorouracil with a lower alkyl ester of the appropriate hypohalic acid, i.e., hypobromic or hypochloric acid. Such esters which can be suitably employed are, for example, methyl hypobromite, methyl hypochlorite, ethyl hypobromite, ethyl hypochlorite, isopropyl hypobromite, isopropyl hypochlorite, butyl hypobromite, butyl hypochlorite and the like. Alternatively, the compounds of Formula I can be prepared by reacting the starting base with bromine or chlorine in a monohydric lower alkanol.

It has been found in accordance with the present invention that the 5,6-substituted dihydropyrimidines of Formula I possess a wide range of activity against various bacteria, protozoa, fungi and yeasts, and application of these compounds in low doses results in effective anti-bacterial/anti-fungal activity against a wide variety of species of microorganisms falling within these classes. The compounds of Formula I wherein $X_1$ is fluoro are preferred. The novel compositions of this invention which comprise as active ingredient a compound of Formula I together with a carrier material are particularly useful for inhibiting or killing a number of species of Gram-negative and Gram-positive bacteria, for example, those from such genera as Pseudomonas, Proteus, Escherichia, Aerobacter, Serratia, Staphylococcus, Bacillus, Micobacterium, Actinomyces, Aspergillus. The compounds of Formula I wherein $X_1$ and $X_2$ are both bromo exhibit a particularly broad spectrum of anti-microbial activity and are therefore especially preferred.

It has now been found as shown below that the growth of the microorganisms specified above as well as others can be successfully controlled by applying to the habitat of the organism a composition containing as the active ingredient a compound of Formula I in amounts of $1\mu$ gram/ml. or less. The novel compositions and process of this invention are useful for the prevention and control of decomposition and decay of materials subject to microbial attack such as leather, fur, paper, plastics, paints, cosmetics, cutting oils and the like.

According to the product aspect of this invention the compounds of Formula I can be formulated into compositions suitable for the control of bacterial and fungal infections. They can also contain such additives as preserving, stabilizing, wetting or emulsifying agents, salts for varying the osmotic pressure, buffers and the like or they can be formulated with other useful materials.

For use as preservatives particularly as industrial fungicides they can be incorporated directly into such materials as cutting oils, paints, plastics, paper and the like or they can be compounded into preparations suitable for application to articles subject to microbiological attack. They are also suitable for use as disinfectant solutions.

The high degree of activity of the compounds of Formula I against a broad spectrum of species of the more commonly encountered microorganisms as well as the manner of preparing the compositions of this invention and their use is more fully illustrated by the examples which follow. These examples are intended to illustrate the invention and are not to be construed as limitative thereof.

EXAMPLE 1.—PREPARATION OF 5-BROMO-5-FLUORO-6-METHOXYHYDROURACIL

In this example, 52.0 grams of 5-fluorouracil were suspended in 1600 ml. of methanol. The suspension was stirred and heated at reflux temperature. At such temperature 64.0 grams of bromine were added drop by drop to the solution. The reaction mixture was refluxed for a period of about 30 minutes, following which the solution was evaporated in a vacuum and the hydrobromide compound was removed therefrom by adding small amounts of methanol and subsequently evaporating same. The crystalline residue thus obtained was then slurried with 500 ml. of water and thereafter filtered by suction. The product was then dried at a temperature within the range from about 60° C. to about 80° C. and there was obtained 5-bromo-5-fluoro-6-methoxyhydrouracil melting at 208° to 210° C. Upon recrystallization from ethyl acetate, 5-bromo-5-fluoro-6-methoxyhydrouracil melting at 214° to 215° was obtained.

EXAMPLE 2.—PREPARATION OF 5,5-DIBROMO-6-METHOXYHYDROURACIL 5-bromouracil, 19.1 g., 0.1 mole, were suspended under stirring in absolute methanol, 1 l., and bromine, 16 g. (5 ml.), 0.2 mole, was added followed by addition of a finely suspended slurry of silver carbonate, 15 g., 0.055 mole. Stirring was continued for 12 hours. After filtering the colorless solution from the silver salts over Celite, it was evaporated in a vacuum and the residue recrystallized from water or ethyl acetate to give 5,5-dibromo-6-methoxyhydrouracil. The compound melts at 208–210° with decompositon. The decomposition products were predominantly 5-bromouracil and decomposition products of methyl hypobromite.

The same compound could also be obtained by heating 1.9 g. 5-bromouracil and 50 ml. methanol and 1 ml. bromine and evaporating the solution to dryness.

EXAMPLE 3.—5,5-DIBROMO-6-METHOXYHYDROURACIL OIL PAINT FORMULATION

An oil paint having the composition set forth below was made by intimately blending in a conventional manner oil, varish and pigments and adding to the resulting paste, driers, solvents and water.

| | Lbs. |
|---|---|
| 5,5-dibromo-6-methoxyhydrouracil | 8.153 |
| Iron oxide pigment | 1498 |
| Amorphous silica | 888 |
| Absestine | 1476 |
| Spar varnish (60 percent N.V.) | 1180 |
| Linseed oil, Q bodied | 2888 |
| Mineral spirits | 626 |
| Water | 88 |
| Co dried (6 percent) | 28 |
| Pb drier (24 percent) | 70 |
| Mn drier (6 percent) | 11 |
| Total weight | 8161.153 |

EXAMPLE 4.—O/W ALL-PURPOSE CREAM

A:
| | Percent |
|---|---|
| Stearic acid | 10 |
| Lanolin | 4 |
| Beeswax | 2 |
| Mineral oil | 20 |
| Tween 40 [1] | 8 |
| Atlas G-1706 beeswax derivative [2] | 2 |

B:
| | |
|---|---|
| Sorbo [3] | 12 |
| Water | 42 |
| 5,5-dibromo-6-methoxyhydrouracil | 0.05 |

C:
Perfume, q.s.

[1] Atlas polyoxyethylene sorbitan monopalmitate.
[2] Polyoxyethylene sorbitol beeswax derivative.
[3] 70 percent aqueous solution of D-sorbitol (Atlas).

The ingredients in Part A were put into a suitable glass lined kettle and were heated to 70° C. The ingredients in Part B were heated to 72° C. in a separate kettle. Part B was then added to Part A with agitation. Perfume was heated at 50° C. and material was poured into jars.

EXAMPLE 5

The determination of fungicidal and germicidal activity of the active ingredients of the novel compositions of this invention was carried out as follows. Two tenths percent aqueous solutions of each of the following compounds was tested individually against Gram-positive and Gram-negative bacteria, actinomycate and fungi.

5-bromo-5-fluoro-6-methoxyhydrourcil (MeOBrFU)
5-bromo-6-ethoxy-5-fluorohydrouracil (EtOBrFU)
5,5-dibromo-6-methoxyhydrouracil (MeOBrU)

Determination of activity was made by conventional bacteriological cylinder-plate agar diffusion assay using HLR No. 1 Medium with incubation at 37° C. for 16 to 40 hours.

HLR No. 1 Medium:
| | Gms./100 ml. of water |
|---|---|
| Proteose peptone | 0.6 |
| Glucose | 0.1 |
| N-2 amine | 0.4 |
| Yeast extract | 0.3 |
| Beef extract | 0.15 |
| Agar | 1.5 |

The methodology employed was analogous to the U.S.P. method for assay of penicillin. The results of the tests are shown in the table which follows.

ZONE OF COMPLETE OR PARTIAL INHIBITION
[Diameter in mm.]

| Microorganism name | MeOBrFU (1μ mole/ml.) | EtOBrFU (1μ mole/ml.) | MeOBrBrU (1μ mole/ml.) | MeOBrBrU (5μ mole/ml.) |
|---|---|---|---|---|
| Pseudomonas aeruginosa | 20 | | 15 | 25 |
| Proteus vulgaris | 25 | 21 | 13 | 22 |
| Escherichia coli | | | 14 | 21 |
| Aerobacter aerogenes | 13 | | 14 | 20 |
| Serratia marcescens | 28 | 20 | 19 | 30 |
| Bodenheimer bacillus | 32 | 27 | 18 | 22 |
| Staphylococcus aureus | 32 | 22 | 19 | 27 |
| Sarcina lutea | 34 | 23 | 20 | 30 |
| Bacillus simplex | | | 23 | 33 |
| Bacillus sp. | | 10 | 21 | 32 |
| Bacillus subtilis | | | 15 | 24 |
| Mycobacterium phlei | 12 | 12 | 15 | 30 |
| Actinomyces cellulosae | 18 | | 16 | 26 |
| Paecilomyces varioti | 17 | 12 | | |
| Penicillium digitatum | 14 | 17 | | |

We claim:
1. A method for preserving organic materials subject to microbial attack which comprises treating said material with an anti-microbial amount of a compound of the formula

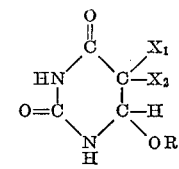

wherein R represents lower alkyl; $X_1$ is fluoro or bromo and $X_2$ is bromo or chloro.

2. A method according to claim 1 wherein the anti-microbial agent is 5,5-dibromo-6-methoxyhydrouracil.

3. A method according to claim 1 wherein the anti-microbial agent is 5-bromo-5-fluoro-6-methoxyhydrouracil.

4. A method for preventing microbial decomposition of an organic material selected from the group consisting of leather, fur, paper, plastics, paints, cosmetics and cutting oils which comprises treating said leather, fur, paper, plastics, paints, cosmetics or cutting oil with an antimicrobial amount of a compound of the formula

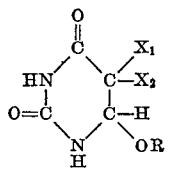

wherein R represents lower alkyl; $X_1$ is fluoro or bromo and $X_2$ is bromo or chloro.

References Cited

Johnson et al.: Journ. Amer. Chem. Soc., vol. 59, 1937, pp. 2436–2439.

Johnson: Journ. Amer. Chem. Soc., vol. 65, 1943, pp. 1218–1219.

Wang: Nature, vol. 180, July 1957, pp. 91–92.

ALBERT T. MEYERS, Primary Examiner

S. J. FRIEDMAN, Assistant Examiner

U.S. Cl. X.R.

106—15; 117—147, 152; 162—161; 252—8.55; 424—168